(12) United States Patent
D'Alessio et al.

(10) Patent No.: US 11,279,488 B2
(45) Date of Patent: Mar. 22, 2022

(54) SEAT ASSEMBLY WITH SACRIFICIAL BACKREST BREAKOVER FEATURE

(71) Applicant: B/E Aerospace, Inc., Winston-Salem, NC (US)

(72) Inventors: Bradford D'Alessio, Winston-Salem, NC (US); Ryan Suhre, Winston-Salem, NC (US); Stephen Puglisi, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/795,743

(22) Filed: Feb. 20, 2020

(65) Prior Publication Data
US 2021/0261259 A1    Aug. 26, 2021

(51) Int. Cl.
*B60N 2/42* (2006.01)
*B60N 2/427* (2006.01)
*B64D 11/06* (2006.01)

(52) U.S. Cl.
CPC ...... *B64D 11/0619* (2014.12); *B64D 11/0639* (2014.12)

(58) Field of Classification Search
CPC .... B60N 2/42745; B60N 2/4228; B60N 2/68; B60N 2/682; B64D 11/0619; B64D 11/0639
USPC ............................ 297/216.13, 216.14, 216.2
See application file for complete search history.

(56) References Cited

U.S. PATENT DOCUMENTS

| | | | |
|---|---|---|---|
| 3,501,200 A * | 3/1970 | Seizo | B60N 2/4228 297/452.19 |
| 3,544,154 A | 12/1970 | Ford | |
| 3,544,164 A * | 12/1970 | Seizo | B60N 2/42709 297/452.2 |
| 4,145,081 A * | 3/1979 | Withers | B60N 2/4221 297/216.14 |
| 4,350,390 A * | 9/1982 | Ogawa | B60N 2/682 297/452.18 |
| 4,394,047 A | 7/1983 | Brunelle | |
| 5,219,202 A * | 6/1993 | Rink | B60N 2/42709 297/216.13 |

(Continued)

FOREIGN PATENT DOCUMENTS

DE   19807581 A1   9/1998
DE   102009057880 A1   6/2011

(Continued)

OTHER PUBLICATIONS

Extended Search Report for European Application No. 21158427.1 dated Jun. 25, 2021, 9 pages.

*Primary Examiner* — Rodney B White

(74) *Attorney, Agent, or Firm* — Suiter Swantz pc llo

(57) ABSTRACT

An aircraft passenger seat assembly and backrest unit attachable to a seat assembly, the backrest being pivotally attached or fixed, and the backrest unit including at least one frame member having adjacent weakened and intact sections provided along a peripheral edge, the weakened section having a first failure load and the intact section having a second failure load greater than the first failure load such that, when a load on a backside of the backrest unit exceeds the first failure load, the weakened section fails and the intact section deforms allowing a portion of the backrest unit to tilt forward beyond an upright sitting position to absorb impact energy.

17 Claims, 6 Drawing Sheets

(56) References Cited

U.S. PATENT DOCUMENTS

| | | | |
|---|---|---|---|
| 5,320,308 A | 6/1994 | Bilezikjian et al. | |
| 5,462,332 A * | 10/1995 | Payne | B60N 2/233 297/216.1 |
| 5,507,555 A * | 4/1996 | Kiguchi | B60N 2/10 297/216.13 X |
| 5,676,421 A * | 10/1997 | Brodsky | B60N 2/4214 297/216.13 |
| 6,022,074 A * | 2/2000 | Swedenklef | B60N 2/2222 297/216.14 |
| 6,024,406 A * | 2/2000 | Charras | B60N 2/888 297/216.14 |
| 6,053,571 A * | 4/2000 | Faigle | B60N 2/4228 297/216.13 X |
| 6,296,306 B1 * | 10/2001 | Specht | B60N 2/0232 297/216.14 |
| 6,375,267 B1 * | 4/2002 | Ishikawa | B60N 2/68 297/452.18 |
| 6,409,263 B1 * | 6/2002 | Seibold | B60N 2/20 297/216.13 |
| 6,471,292 B1 * | 10/2002 | Sundgren | B60N 2/42709 297/216.13 |
| 6,478,256 B1 | 11/2002 | Williamson | |
| 6,554,356 B1 * | 4/2003 | Crose | B60N 2/242 297/216.13 |
| 7,066,552 B2 * | 6/2006 | Yoshida | B60N 2/64 297/452.18 |
| 7,070,236 B2 * | 7/2006 | Kawashima | B60N 2/4228 297/216.13 X |
| 7,537,283 B2 * | 5/2009 | Niitsuma | B60N 2/4214 297/216.13 X |
| 7,992,934 B2 * | 8/2011 | Cailleteau | B60N 2/4214 297/216.14 |
| 8,132,862 B2 * | 3/2012 | Yamada | B60N 2/682 297/216.13 X |
| 8,459,747 B2 * | 6/2013 | Watanabe | B60N 2/688 297/452.2 |
| 8,845,019 B2 * | 9/2014 | Sawada | B60N 2/42745 297/216.1 |
| 8,864,227 B2 * | 10/2014 | Funke | B60N 2/4214 297/216.13 |
| 8,955,906 B2 * | 2/2015 | Evans | B60N 2/4228 297/216.13 |
| 9,511,691 B2 * | 12/2016 | Komatsubara | B60N 2/0705 |
| 9,738,194 B2 * | 8/2017 | Hoshi | B60N 2/68 |
| 10,227,023 B2 * | 3/2019 | Lasell | B60N 2/42709 |
| 10,279,913 B2 | 5/2019 | Malligere et al. | |
| 10,384,783 B2 * | 8/2019 | Murray | B60N 2/42781 |
| 10,414,501 B2 | 9/2019 | Thompson et al. | |
| 10,611,280 B2 * | 4/2020 | Hashimoto | B60N 2/682 |
| 2004/0113481 A1 * | 6/2004 | Saberan | B60N 2/682 297/452.18 |
| 2004/0227389 A1 * | 11/2004 | Yoshida | B60N 2/64 297/452.18 |
| 2005/0093352 A1 * | 5/2005 | Yasuda | B60N 2/888 297/284.1 |
| 2008/0203786 A1 * | 8/2008 | Niitsuma | B60N 2/42745 297/216.13 |
| 2010/0176621 A1 * | 7/2010 | Aufrere | B60N 2/42736 297/216.1 X |
| 2011/0193379 A1 * | 8/2011 | Nitsuma | B60N 2/42709 297/216.14 |
| 2012/0325780 A1 * | 12/2012 | Kushiyama | B60N 2/682 219/76.14 |
| 2013/0069415 A1 * | 3/2013 | Yasuda | B60N 2/686 297/452.18 |
| 2013/0106151 A1 * | 5/2013 | Kaku | B60N 2/682 297/216.1 |
| 2013/0106152 A1 * | 5/2013 | Kaku | B60N 2/4249 297/216.1 |
| 2013/0106153 A1 * | 5/2013 | Kaku | B60N 2/4235 297/216.1 |
| 2013/0113243 A1 * | 5/2013 | Kaku | B60N 2/42709 297/216.1 |
| 2013/0113244 A1 * | 5/2013 | Kaku | B60N 2/68 297/216.1 |
| 2013/0113245 A1 * | 5/2013 | Kaku | B60N 2/42709 297/216.1 |
| 2014/0103626 A1 * | 4/2014 | Seki | B60N 2/42745 297/216.13 X |
| 2015/0306986 A1 * | 10/2015 | Jarry | B60N 2/68 297/362 |
| 2018/0111526 A1 * | 4/2018 | Okimura | B60N 2/90 |
| 2019/0031352 A1 | 1/2019 | Pierson-Moonan et al. | |
| 2020/0001753 A1 * | 1/2020 | Saada | B60N 2/933 |

FOREIGN PATENT DOCUMENTS

| | | |
|---|---|---|
| WO | 2012037218 A1 | 3/2012 |
| WO | 2016160106 A1 | 10/2016 |

* cited by examiner

SEAT ASSEMBLY WITH SACRIFICIAL BACKREST BREAKOVER FEATURE

BACKGROUND

Aircraft passenger seats are designed and constructed according to government regulations and aircraft manufacturer specifications. Virtually every aspect of seat design is thus constrained by requirements imposed by safety, weight and cost considerations. Within these limits the seat must also be aesthetically pleasing, comfortable to a seated passenger, and functional for the passenger as well as airline maintenance, repair and cleaning crews.

Regulatory requirements for aircraft components in the U.S. are based on Title 14 of the Code of Federal Regulations (C.F.R.) Part 25, which sets out standards for aircraft airworthiness. For aircraft passenger seats, sections § 25.561 and § 25.562 of Title 14 specify requirements for seat structures that may give passengers a reasonable chance of escaping serious injury in a minor crash-landing situation.

Main cabin or "coach" class seats are typically constructed with a seat bottom frame (bottom chassis) formed from two or more leg modules and section assembly modules joined together by several beam elements that connect the leg modules and section assembly modules in spaced-apart relation to each other, and collectively form a so-called "ladder frame assembly." A seat bottom unit is mounted on the ladder frame assembly. The seat bottom unit is usually stationary. A backrest unit is usually pivotally mounted between two of the section assembly modules so that the angle of the backrest unit can be controlled for safety, comfort and passenger ingress and egress past the rear of the seat. Because of the relatively short pitch between rows of seats in the main cabin, the normal range of pivoting motion of the backrest unit is limited. The degree of rearward recline motion is constrained by the position of the rearward row of seats and the requirement to leave the aft-seated passenger with enough room to enter and exit his or her own seat as well as use the meal tray. The degree of forward motion of the backrest unit is typically limited to a position where the backrest is in a full upright position for taxi, take-off and landing (TTOL).

Passenger seats are typically designed whereby the backrest unit will not move beyond the forward and rear positions under normal circumstances (i.e., regular or standard use including abuse loads). However, provision must also be made for the abnormal situation where severe G-force loads may propel a passenger forward toward the backrest unit directly in front of them. In such cases, the backrest unit must be allowed to move forward beyond the full upright position (i.e., breakover) in a controlled manner to minimize or reduce injury to a passenger who may be thrown against the backrest unit during an emergency deceleration (e.g., high G-force) event.

For aircraft passenger seats, 14 C.F.R. § 25.562 requires that for a high G-force event (e.g., 16 Gs) where head contact with seats or other structures may occur, some type of protection must be provided so that the so-called "Head Injury Criterion" (HIC) does not exceed 1000 units. 14 C.F.R. § 25.785 has a primary goal of protecting occupants from serious injury during hard landing conditions, including injurious interactions of the head and neck (ref ANM-115-17-002). Conventional methods to generate a low HIC score typically involve either spacing passenger seats far enough apart to avoid head contact, thereby severely limiting options for seating arrangements which increase the number of seats within the cabin, or building a breakover mechanism into the backrest unit.

In conventional breakover mechanisms, breakover may occur when a passenger impacts a forward backrest unit with enough force to actuate a mechanism built into the seat structure which allows the backrest to tilt forward beyond the full upright position. The movement of the backrest unit in response to a passenger impact may dissipate energy and lower the HIC score. In addition to the HIC score, damage done to the backrest during a high G-force event must not prevent passenger egress or harm the passengers after an event. For example, the seat must stay largely intact after an event.

While mechanical assemblies exist for providing breakover in a backrest unit, such assemblies tend to complicate the seat design, add weight, add cost, and are prone to wear and failure. Thus, there exists a need for a breakover solution that is economical, allows for smaller packaging, and reduces part count, among other advantages.

BRIEF SUMMARY

In one aspect, embodiments of the inventive concepts disclosed herein are directed to an aircraft passenger seat assembly including a support frame, a seat bottom unit mounted on the support frame, and a backrest unit pivotally mounted to the support frame. The backrest unit is configured to pivot relative to the support frame between an upright position and a reclined position. The backrest unit includes at least one frame member having a weakened section and an adjacent intact section positioned along a peripheral edge of the at least one frame member, the weakened section having a first failure load and the intact section having a second failure load greater than the first failure load such that, when a load on a backside of the backrest unit exceeds the first failure load, the weakened section is configured to fail and the intact section is configured to deform thereby allowing a portion of the backrest unit above the weakened and intact sections to move forward beyond the upright position to absorb impact energy.

In some embodiments, the at least one frame member is a tubular body and the weakened section is an elongated cut coupled together with at least one spot weld configured to break thereby allowing the cut to open.

In some embodiments, the tubular body has adjacent sides and the weakened section is an elongated cut extending along a portion of at least two of the adjacent sides.

In some embodiments, the weakened section and the adjacent intact section together form an annular section around the peripheral edge of the tubular body.

In some embodiments, the backrest unit pivots about a first pivot axis and the weakened and intact sections are positioned spaced above the first pivot axis.

In some embodiments, the at least one frame member is a U-shaped frame member having spaced apart ends pivotally attached to the support frame, wherein the weakened and intact sections are symmetrically provided on each of the spaced apart ends positioned above the respective pivotally attached spaced ends.

In some embodiments, the support frame is stationary and includes at least two leg modules, at least two section assembly modules, and at least two beam elements connecting the at least two leg modules and the at least two section assembly modules in spaced-apart relation to each other, wherein the backrest unit is pivotally mounted between two of the at least two section assembly modules.

In some embodiments, the backrest unit includes an upper portion supporting a headrest unit.

In some embodiments, the at least one frame member is a metal part.

In another aspect, embodiments of the inventive concepts disclosed herein are directed to an aircraft passenger seat assembly including a support frame, a seat bottom unit mounted on the support frame, and a backrest unit mounted to the support frame, the backrest unit providing a fixed sitting position. The backrest unit includes at least one frame member having a weakened section and an adjacent intact section positioned along a peripheral edge of the at least one frame member, the weakened section having a first failure load and the intact section having a second failure load greater than the first failure load such that, when a load on a backside of the backrest unit exceeds the first failure load, the weakened section is configured to fail and the intact section is configured to deform thereby allowing a portion of the backrest unit above the weakened and intact sections to move forward beyond the fixed sitting position.

In yet another aspect, embodiments of the inventive concepts disclosed herein are directed to a backrest unit attachable to a support frame for providing an upright sitting position. The backrest unit includes at least one frame member having a weakened section and an adjacent intact section positioned along a peripheral edge of the at least one frame member. The weakened section has a first failure load and the intact section has a second failure load greater than the first failure load such that, when a load on the least one frame member exceeds the first failure load, the weakened section is configured to fail and the intact section is configured to deform thereby allowing a portion of the backrest unit above the weakened and intact sections to move forward beyond the upright sitting position.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Figure 1:
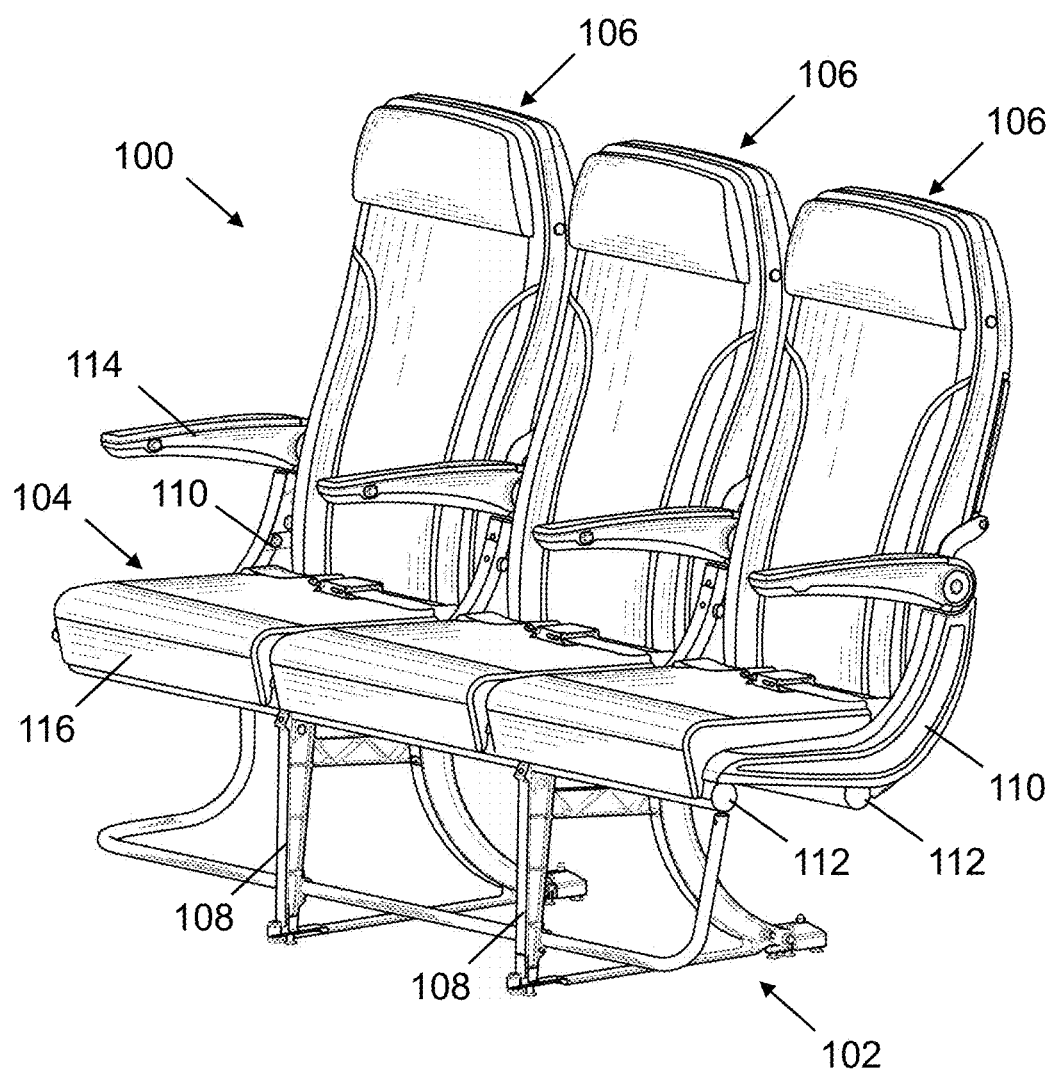
FIG. 1 is a front perspective view of a seating unit equipped with backrest units having a sacrificial breakover feature according to an embodiment of the invention.
Figure 2:
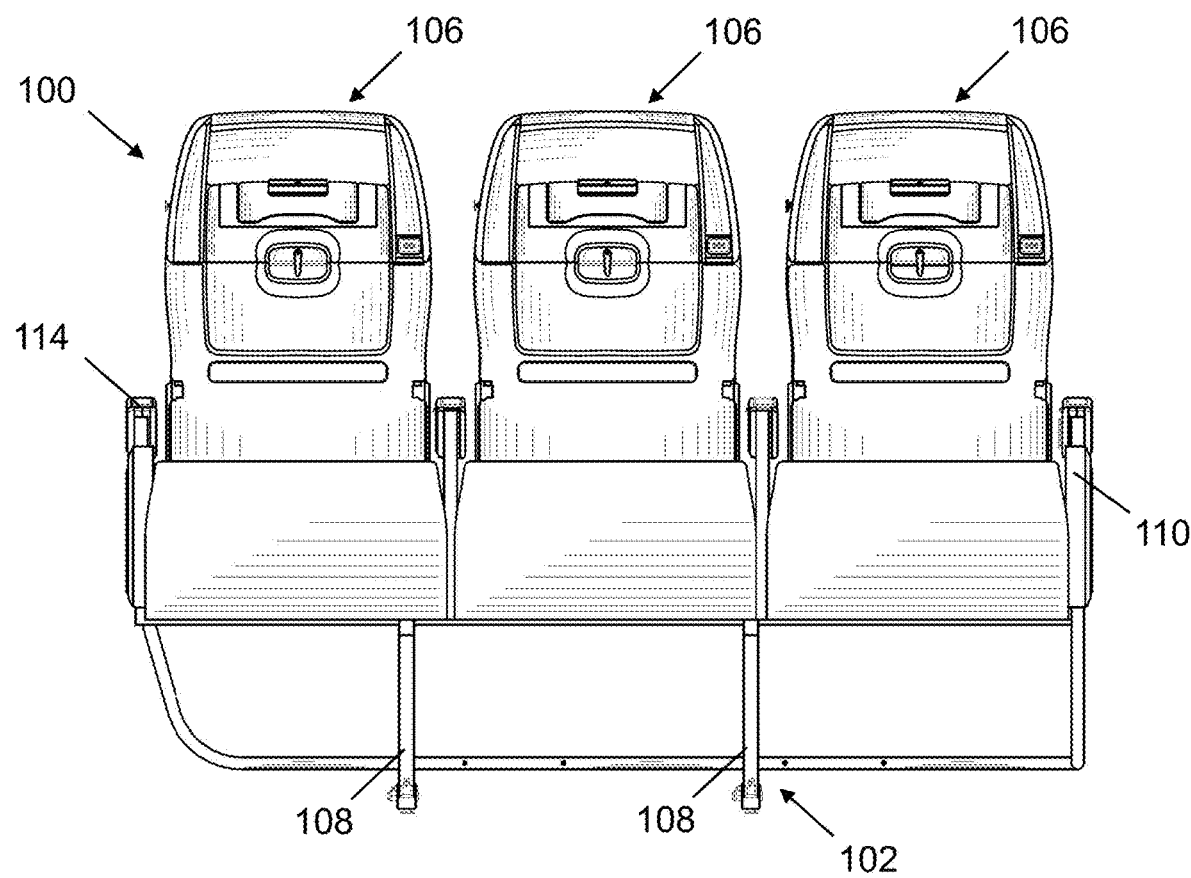
FIG. 2 is a back view of the seating unit shown in FIG. 1.
Figure 3:
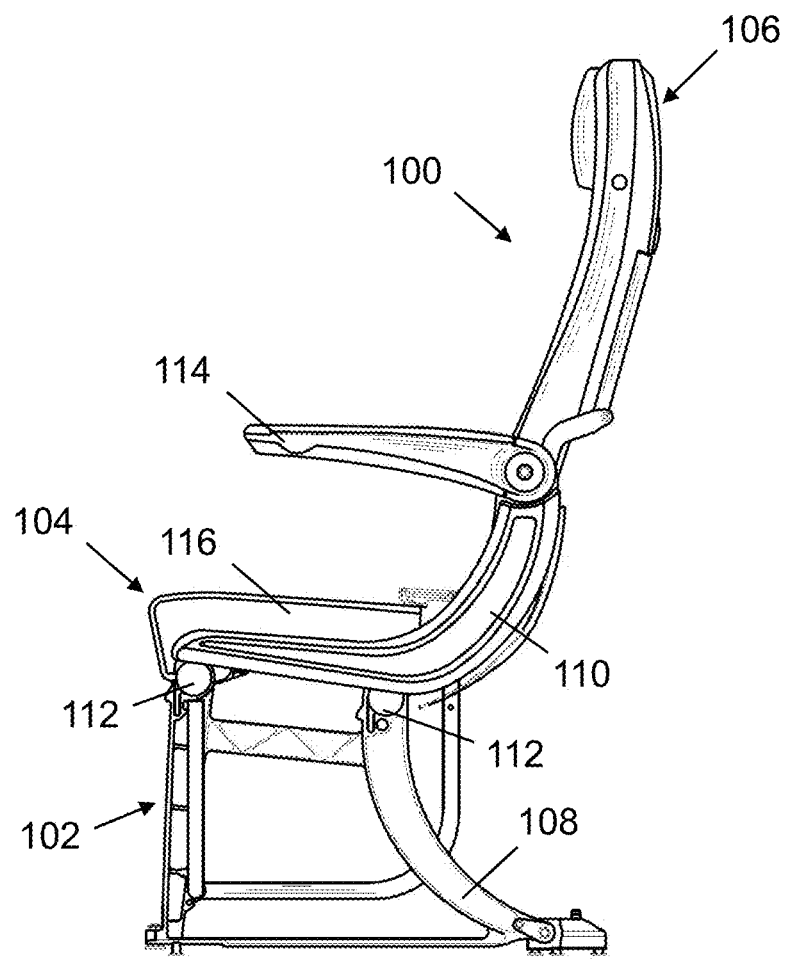
FIG. 3 is a side view of the seating unit shown in FIG. 1.

FIGS. 1-3 illustrate respective front, back and side views of a non-limiting example of a seat assembly 100 for use in an aircraft passenger cabin, for example, a main passenger cabin. The seat assembly 100 shown includes three laterally adjacent seats forming a single row. Other examples of seat assemblies can include single seats, two laterally adjacent seats, more than three laterally adjacent seats, and other arrangements of seats. The seat assembly 100 generally includes a stationary support frame 102, a seat bottom unit 104 mounted on the support frame, and individual backrest units 106 mounted to the support frame. The support frame 102 attaches to floor tracks using conventional mechanisms such as track fasteners. In some embodiments, the support frame 102 includes at least two leg modules 108 and at least two section assembly modules 110 or "spreaders" joined by transverse beam elements 112 that connect the leg modules and section assembly modules in spaced-apart relation to each other. The section assembly modules optionally support armrests 114 configured to pivot between stowed and use positions. The seat bottom unit 104 may include joined or separate seat bottom assemblies 116 each including a rigid seat pan, cushion element positioned atop the rigid seat pan, and dress cover. The seat bottom unit 104 may be stationary or the individual seat bottom assemblies 116 may adjust independently or together with backrest recline motion. In some embodiments, each individual seat bottom assembly 116 is positioned between two section assembly modules 110.

Individual backrest units 106 mount to the support frame 102. In some embodiments, each backrest unit 106 is pivotally attached between two of the section assembly modules 110 and is configured to pivot between an upright position for taxi, take-off and landing (TTOL), and a reclined position for comfort during flight. Known recline mechanisms can be utilized to lock the backrest unit angle and return an unloaded backrest unit to the upright position. In some embodiments, each backrest unit 106 is fixed providing a fixed upright sitting position. Like the seat bottom assemblies 116, each backrest unit 106 may include at least one rigid frame element, a cushion element supported by the rigid frame element, and a dress cover. Backrest units 106 may include integrated headrests or separate headrests may be coupled atop the backrest unit. In some embodiments, headrests may be adjustable to enhance comfort.

The ability of the individual backrest units 106 to recline, and the degree of rearward recline motion of each backrest unit, may be constrained by the position of the rearward row of seats and/or the seat construction itself. The degree of forward pivoting motion of the backrest units 106, or the fixed angle of a stationary backrest unit, is limited to a full upright position for TTOL.

During typical or "standard" use, which corresponds to a first condition of the breakover feature as discussed further below, the backrest unit 106 is prevented from moving forward beyond the upright position. As used herein, the term "movement" or "move" with respect to backrest unit motion forward beyond the upright sitting position, may include one or more of pivoting, tilting, rotation, torsion, and translational movements. During typical or standard use, the backrest units 106 are routinely subjected to small loads, i.e. load values below a predetermined threshold value, imposed by the seat occupant and others pushing, pulling or leaning on the backrest unit, such as regularly occurs during seat ingress/egress, hard landings, short stops, etc. During atypical or "non-standard" use, corresponding to a second condition of the breakover feature as discussed further below, at least a portion of the backrest unit 106 moves forward, movement as defined above, beyond the upright sitting position. During atypical or non-standard use, large loads, i.e. load values above a predetermined threshold value, imposed on a backside of the backrest unit 106 cause the backrest unit to move forward beyond the upright sitting position. Large loads on a backrest unit 106 can occur during high G-force events, for example about 16 Gs, such as from a head strike from an aft-seated passenger. In the event of a large load on the backside of the backrest unit 106, a load exceeding a predetermined threshold value, an element of the backrest unit is configured to "fail" such that an adjacent portion of the element is configured to deform thereby allowing a portion of the backrest unit to move forward beyond the upright position to absorb impact energy.

While some conventional breakover mechanisms utilize accelerometers and inertia devices to decouple the backrest responsive to exceeding threshold G-forces, regardless of actual backrest impact, the breakover feature of the present invention maintains the coupling between the backrest unit and the support frame, and in some embodiments, requires backrest impact to change the breakover feature from a first condition to a second condition. In other words, in some embodiments, regardless of the magnitude of the G-force event, only those backrest units 106 subject to a load exceeding a predetermined threshold value will breakover.

Benefits of the breakover feature disclosed herein include, but are not limited to, prevention or reduction of injuries to passengers seated in the aircraft seats in situations where severe G-force loads may propel the passengers forward toward the backrest unit directly in front of them, as well as preservation of the structural integrity of unstruck backrest units. The controlled forward movement of the backrest unit due to the action of the breakover feature in response to an impact during a high G-force event may dissipate energy and lower the Head Injury Criterion (HIC) score as well as reduce neck injury, egress, or harm potential, to ensure adherence to requirements delineated in 14 C.F.R. § 25.785 without having to increase the seat pitch between seats.

FIGS. 1-3 show the backrest units 106 each in their respective full upright position for TTOL. Again, the backrest units 106 may be pivotally attached or may be stationary. In embodiments in which the backrest units 106 pivot relative to the attached support frame 102, the backrest units are pivotally attached at one end and pivot about a horizontal pivot axis. Under typical or standard use, adjustable backrest units 106 may be selectively reclined rearward but are prevented from moving forward beyond the full upright TTOL position shown.

Figure 4:
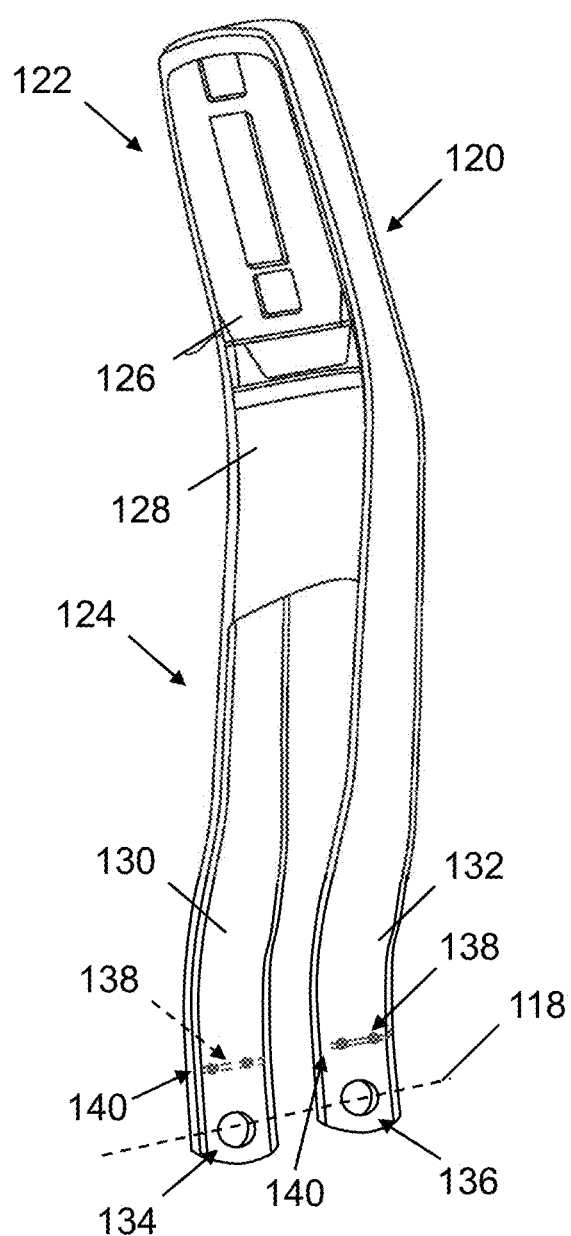
FIG. 4 is a front perspective view of a frame member of a backrest unit according to an embodiment of the invention.

FIG. 4 shows a non-limiting example of a frame member 120 of one of the backrest units. The frame member 120 is rigid and forms the general shape of the backrest unit and includes upper and lower portions 122, 124. In some embodiments, the upper portion 122 supports a headrest pan 126 and the lower portion 124 supports, for example, a backrest pan or webbing 128. In some embodiments, the frame member 120 is a continuous U-shaped frame member having a top portion connecting spaced apart side portions 130, 132 each having an end 134, 136 attachable to the support frame. In the case of a pivoting backrest unit, the ends 134, 136 are pivotally attachable to the support frame, such as between two spaced section assemblies, such that the frame member and backrest unit pivot about a horizontal pivot axis 118 between the upright and reclined positions.

In some embodiments, the frame member 120 is a metal part. In some embodiments, the frame member 120 is a composite part or includes both metal and composite parts. In some embodiments, the frame member 120 is a tubular body having a round profile, or a rectangular profile having adjacent sides. The breakover feature as shown is implemented as a weakened section 138 provided on each of the spaced portions 130, 132 positioned above the horizontal pivot axis 118. The weakened sections 138 are symmetrically positioned on both sides of the frame member 120 and at the same height above the pivot axis to constrain breakover movement to substantially the forward direction, as lateral backrest unit motion may encroach into the aisle in the case of the aisle seat or into the seat space of an adjacent passenger in the case of all seats.

In some embodiments, the breakover feature is formed as an annular section around each frame portion 130, 132. The annular section includes a first part and a second part adjacent the first part continuously along the annular section. In some embodiments, the first part is the weakened or "sacrificial" section 138 having a first condition and a second condition. In the first condition, the weakened section 138 remains structurally intact during the typical or regular use of the backrest unit. In the second condition, the weakened section 138 fails, such as by breaking, for the atypical use. The weakened section 138 changes from the first condition to the second condition responsive to a load applied on the backrest unit, such as from a passenger head strike, exceeding a predetermined threshold load value causing the weakened section to fail or break.

In some embodiments, the weakened section 138 is provided along a portion of the peripheral edge of the frame member 120 and has a first failure load corresponding to the predetermined threshold value load. An intact section 140 of the frame member is positioned adjacent the weakened section 138, such as along the annular section, and has a second failure load greater than the first failure load. When the predetermined threshold load value on the backrest unit is exceeded, the lesser failure load of the weakened section 138 as compared to the intact section 140 causes the weakened section to fail or break, thereby weakening the annular section relative to the surrounding portion of the frame member and consequently causing the adjacent intact section 140 to deform allowing a portion of the backrest unit to move forward or "breakover" beyond the upright sitting position. In the case of a metal frame member part, deformation may include bending without breaking such that the frame member portions above and below the annular section remain coupled together.

Figure 5:
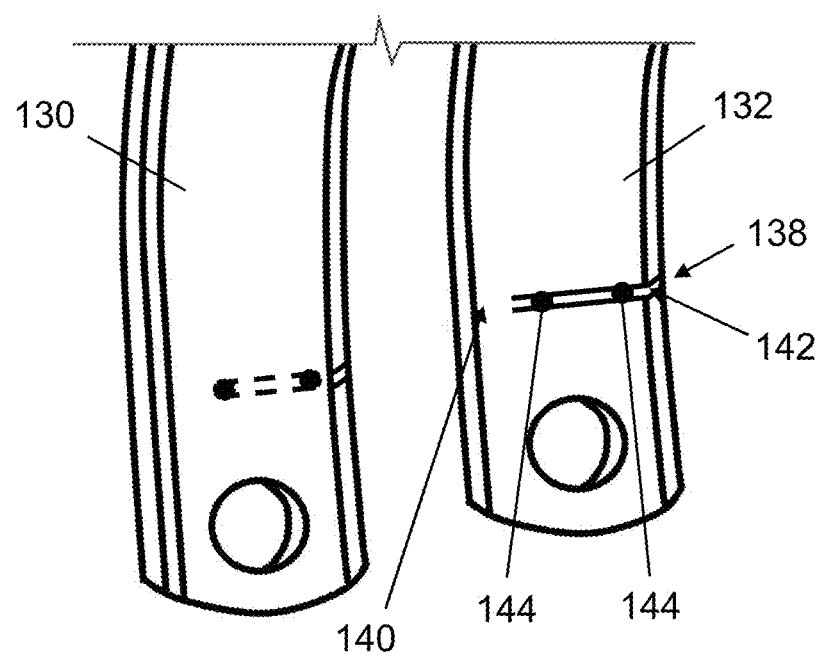
FIG. 5 is a detailed view of a portion of the frame member shown in FIG. 4.

FIG. 5 shows part of the spaced portions 130, 132 of the frame member 120. In the non-limiting example shown, the weakened section 138 is formed as an elongated cut 142 through a portion of the frame member along adjacent sides, and opposing sides of the cut are coupled together with at least one spot weld 144. To constrain the backrest unit to breakover movement in the forward direction, a weakened section 138 may be provided along a portion of a back and at least one side of each spaced portion of the frame member 120 such that the adjacent intact section 140 is provided forward of the weakened section 138 with respect to the seat direction. For example, an elongated the cut 142 may extend through the frame member 120 along the backside and partway along a portion of one or more sides adjacent the backside, and the spot welds 144 may be provided in spaced apart relation along the length of the elongated cut. Responsive to loading exceeding the threshold value, the spot welds 144 break, in some embodiments in sequence, to "open" the cut thereby causing the adjacent intact portion 140 to deform from the remaining force allowing a portion of the backrest unit to move (e.g., tilt) forward beyond the upright position. The length and position of the elongated cut 142, number, placement and size of the spot welds 144, and dimension and shape of the intact portion 140 can be customized such that the breakover performs as intended. In lieu of a cut, weakened sections can also be provided incorporating other features including, but not limited to, variable wall thicknesses and alternative coupling fasteners.

In some embodiments, the weakened section 138 is positioned above the attached end of the frame member to the support frame, and particularly above the horizontal pivot axis in the case of a pivoting backrest unit, such that breakover causing the elongated cut to "open" causes the portion of the backrest unit above the weakened section to move forward beyond the upright position while the portion of the frame member below the weakened section remains stationary. Because exposed sharp metal edges can cause injury to passengers during impact and egress after impact, the weakened sections 136 may remain concealed in both the first and second conditions with a covering such as one or more of shrouds, cushion elements and dress covers.

Other frame member configurations are possible. For example, a solid frame member may have a cut through a portion of the frame providing the weakened section, or alternatively, the sectional profile of the solid frame member at the weakened section may differ as compared to the frame profiles immediately above and below in order to constrain the condition change to the weakened section. In the case of composite frame members likely to break as opposed to deform, frame member may include composite and metal parts with the weakened section provided on the metal part.

Figures 6A, 6B, 6C:
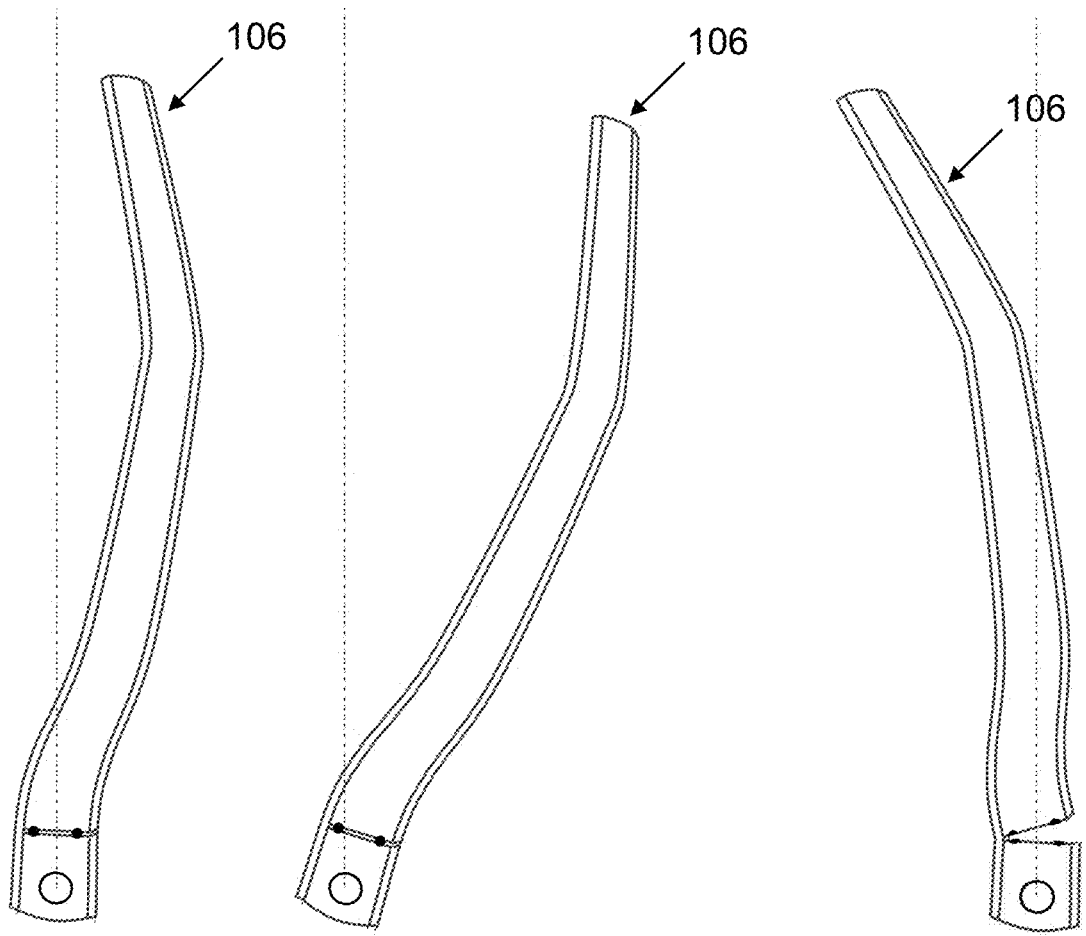
FIGS. 6a-6c shows respective upright, reclined and breakover positions of a backrest unit for use with a seat assembly.

FIGS. 6*a*-6*c* show exaggerated backrest unit 106 positions in each of the full upright position (FIG. 6*a*), full reclined position (FIG. 6*b*), and backrest breakover (FIG. 6*c*) with respect to vertical for comparison. As evident from the comparison, the backrest unit position after breakover is forward of the full upright position as a result of the weakened section failing and the intact section deforming to allow the portion of the backrest unit above the breakover feature to move forward. Forward movement is constrained by the construction of the intact section such that the backrest unit does not break free and detach.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the scope of the present disclosures. The accompanying claims and their equivalents are intended to cover such forms or modifications as would fall within the scope of the present disclosures.

What is claimed is:

1. An aircraft passenger seat assembly, comprising:
   a support frame;
   a seat bottom unit mounted on the support frame; and
   a backrest unit pivotally mounted to the support frame, the backrest unit configured to pivot relative to the support frame between an upright position and a reclined position, the backrest unit including at least one frame member including spaced apart first and second frame portions, each of the spaced apart first and second frame portions comprising a weakened section and an adjacent intact section positioned along a peripheral edge thereof, the weakened section having a first failure load and the intact section having a second failure load greater than the first failure load such that, when a load on a backside of the backrest unit exceeds the first failure load, the weakened section is configured to fail and the intact section is configured to deform while remaining attached thereby allowing a portion of the backrest unit above the weakened and intact sections to rotate forward beyond the upright position;
   wherein the weakened section and the intact section are positioned relative to each other such that the weakened section is configured to open responsive to force on the backrest unit exceeding the second load failure thereby causing the intact section to deform; and
   wherein the weakened section comprises a continuous opening positioned along a portion of opposing sides and a rear end of the respective one of the first and second frame portions, at least one first spot weld positioned on at least one of the opposing sides proximate the rear end, and at least one spot weld positioned on at least one of the opposing sides proximate the intact section, wherein each of the at least one spot welds couples spaced upper and lower portions of the respective one of the first and second frame portions across the continuous opening, and wherein the at least one spot welds collectively determine a value of the first failure load.

2. The aircraft passenger seat assembly according to claim 1, wherein the at least one frame member is a tubular body and the continuous opening is formed by an elongated cut.

3. The aircraft passenger seat assembly according to claim 1, wherein the weakened section and the adjacent intact section together form an annular section around the peripheral edge of the tubular body.

4. The aircraft passenger seat assembly according to claim 1, wherein the backrest unit pivots about a first pivot axis and the weakened and intact sections are positioned spaced above the first pivot axis.

5. The aircraft passenger seat assembly according to claim 1, wherein the at least one frame member is a U-shaped frame member having spaced apart ends pivotally attached to the support frame, wherein the weakened and intact sections are symmetrically provided on each of the spaced apart ends positioned above the respective pivotally attached spaced ends.

6. The aircraft passenger seat assembly according to claim 1, wherein the support frame is stationary and comprises:
   at least two leg modules;
   at least two section assembly modules; and
   at least two beam elements connecting the at least two leg modules and the at least two section assembly modules in spaced-apart relation to each other;
   wherein the backrest unit is pivotally mounted between two of the at least two section assembly modules.

7. The aircraft passenger seat assembly according to claim 1, wherein the backrest unit includes an upper portion supporting a headrest unit.

8. The aircraft passenger seat assembly according to claim 1, wherein the at least one frame member is a metal part.

9. An aircraft passenger seat assembly, comprising:
   a support frame;
   a seat bottom unit mounted on the support frame; and
   a backrest unit mounted to the support frame, the backrest unit providing a fixed sitting position, the backrest unit including at least one frame member including spaced apart first and second frame portions each having a weakened section and an adjacent intact section positioned along a peripheral edge thereof, the weakened section having a first failure load and the intact section having a second failure load greater than the first failure load such that, when a load on a backside of the backrest unit exceeds the first failure load, the weakened section is configured to fail and the intact section is configured to deform while remaining attached thereby allowing a portion of the backrest unit above the weakened and intact sections to rotate forward beyond the fixed sitting position;

wherein the weakened section and the adjacent intact section are positioned relative to each other such that the weakened section is configured to open responsive to force on the backrest unit exceeding the second load failure thereby causing the intact section to deform; and wherein the weakened section comprises a continuous opening positioned along a portion of opposing sides and a rear end of the respective one of the first and second frame portions, at least one first spot weld positioned on at least one of the opposing sides proximate the rear end, and at least one spot weld positioned on at least one of the opposing sides proximate the intact section, wherein each of the at least one spot welds couples spaced upper and lower portions of the respective one of the first and second frame portions across the continuous opening, and wherein the at least one spot welds collectively determine a value of the first failure load.

10. The aircraft passenger seat assembly according to claim 9, wherein the at least one frame member is a tubular body and the continuous opening is formed by an elongated cut.

11. The aircraft passenger seat assembly according to claim 10, wherein the weakened section and the adjacent intact section together form an annular section around the peripheral edge of the tubular body.

12. The aircraft passenger seat assembly according to claim 10, wherein the at least one frame member is a U-shaped frame member having spaced apart ends attached to the support frame, wherein the weakened and intact sections are symmetrically provided on each of the spaced apart ends positioned above the respective attached spaced ends.

13. The aircraft passenger seat assembly according to claim 9, wherein the at least one frame member is a metal part.

14. A backrest unit pivotally attachable to a support frame and providing an upright sitting position and a reclined sitting position of the backrest unit relative to the support frame, the backrest unit comprising:

at least one frame member including spaced apart first and second frame portions each having a weakened section and an adjacent intact section positioned along a peripheral edge thereof;

wherein the weakened section has a first failure load and the intact section has a second failure load greater than the first failure load such that, when a load on the least one frame member exceeds the first failure load, the weakened section is configured to fail and the intact section is configured to deform while remaining attached thereby allowing a portion of the backrest unit above the weakened and intact sections to rotate forward beyond the upright sitting position;

wherein the weakened section and the adjacent intact section are positioned relative to each other such that the weakened section is configured to open responsive to force on the backrest unit exceeding the second load failure thereby causing the intact section to deform; and wherein the weakened section comprises a continuous opening positioned along a portion of opposing sides and a rear end of the respective one of the first and second frame portions, at least one first spot weld positioned on at least one of the opposing sides proximate the rear end, and at least one spot weld positioned on at least one of the opposing sides proximate the intact section, wherein each of the at least one spot welds couples spaced upper and lower portions of the respective one of the first and second frame portions across the continuous opening, and wherein the at least one spot welds collectively determine a value of the first failure load.

15. The backrest unit according to claim 14, wherein the at least one frame member is a tubular body and the continuous opening is formed by an elongated cut.

16. The backrest unit according to claim 14, wherein the at least one frame member is a U-shaped frame member having spaced apart ends, and wherein the weakened and intact sections are symmetrically provided on each of the spaced apart ends.

17. The backrest unit according to claim 14, wherein the at least one frame member is a metal part.

* * * * *